United States Patent [19]

Morimoto

[11] Patent Number: 5,145,125
[45] Date of Patent: Sep. 8, 1992

[54] FISHING REEL WITH ONE-WAY MECHANISM

[75] Inventor: Shinichi Morimoto, Sakai, Japan

[73] Assignee: Shimano Industrial Co., Ltd., Osaka, Japan

[21] Appl. No.: 539,592

[22] Filed: Jun. 18, 1990

[30] Foreign Application Priority Data

Jun. 16, 1989 [JP] Japan .................. 1-70966[U]

[51] Int. Cl.⁵ .......................... A01K 89/015
[52] U.S. Cl. .................................. 242/268
[58] Field of Search .................. 242/268, 267

[56] References Cited

U.S. PATENT DOCUMENTS

| | | | |
|---|---|---|---|
| 1,554,786 | 9/1925 | Case | 242/268 X |
| 3,029,040 | 4/1962 | Wood | 242/268 X |
| 3,612,425 | 10/1971 | Shakespeare et al. | 242/268 X |
| 3,612,437 | 10/1971 | Alleback et al. | 242/268 X |
| 4,634,079 | 1/1987 | Furomoto | 242/268 X |
| 4,779,819 | 10/1988 | Emura et al. | 242/268 |

FOREIGN PATENT DOCUMENTS

57-39027 8/1982 Japan .

Primary Examiner—Daniel P. Stodola
Assistant Examiner—William G. Battista
Attorney, Agent, or Firm—Dickstein, Shapiro & Morin

[57] ABSTRACT

A fishing reel comprising a reel body, a handle shaft rotatably mounted on the reel body, a main gear relatively rotatably supported by the handle shaft, a drag braking mechanism mounted between the main gear and the handle shaft, an adjusting member mounted on the handle shaft for adjusting a braking force of the drag braking mechanism, and a one-way mechanism for permitting only forward rotation of the handle shaft.

The one-way mechanism includes an annular member unrotatably and axially slidably mounted on the handle shaft between the drag braking mechanism and the adjusting member, cams defined in an opposing face of an opposing member opposed to a periphery of the annular member to be locked against the reel body for locking backward rotation of the handle shaft, and backward rotation locking means pressingly engageable between the cams and the periphery of the annular member with the backward rotation of the handle shaft.

7 Claims, 1 Drawing Sheet

FISHING REEL WITH ONE-WAY MECHANISM

BACKGROUND OF THE INVENTION

1. Field of the Invention

The present invention relates to a fishing reel, and more particularly to a fishing reel comprising a reel body, a handle shaft rotatably mounted on the reel body, a main gear relatively rotatably supported by the handle shaft, a drag braking mechanism mounted between the main gear and the handle shaft, an adjusting member mounted on the handle shaft for adjusting a braking force of the drag braking mechanism, and a one-way mechanism mounted around the handle shaft inside of the reel body for permitting only forward rotation of the handle shaft.

2. Description of the Prior Art

A known example of fishing reels of the above-noted type is shown in Japanese utility model publication No. 57-39027 in which a spacer is disposed between the adjusting member and the drag braking mechanism thereby to adjust the braking force of the drag braking mechanism of the spacer with rotation of the adjusting member to provide a spool with a predetermined braking force. The handle shaft includes an inward axial end integrally forming a backward rotation locking gear defining ratchet teeth in an outer periphery thereof, while the reel body supports a ratchet pawl inside thereof for meshing with the ratchet teeth thereby permitting only a one-way rotation of the handle shaft and prohibiting backward rotation thereof to provide the main gear with the braking force of the drag braking mechanism. When winding up the fish caught by the hook and a drawing force of a fishing line wound on the spool is smaller than the braking force of the drag braking mechanism predetermined by the adjusting member, the braking force does not allow the main gear to be rotated to prevent the backward rotation of the spool. In contrast, when the drawing force of the fishing line is larger than the braking force of the drag braking mechanism, the main gear is rotated relative to the handle shaft while sliding the drag braking mechanism thereby to backwardly rotate the spool.

However, according to the conventional fishing reel as the above, the ratchet teeth of the backward rotation locking gear mounted on the handle shaft comprise flat and long teeth in order to guarantee a strength thereof. Therefore, a large space is required between the teeth for a reliable engagement with the ratchet pawl. As a result, an extreme end of the ratchet pawl and a bottom of the ratchet teeth define large play therebetween. Then, the ratchet pawl and the ratchet teeth collide against each other when the spool is rotated in the backward direction, which causes a shock and provides the fisherman with an uncomfortable feeling. The conventional fishing reel is also disadvantageous in that the handle shaft includes not only the backward rotation locking gear but also the spacer between the drag braking mechanism and the adjusting member to increase a transverse dimension of the reel body, and consequently to enlarge its entirety.

SUMMARY OF THE INVENTION

An object of the present invention is to provide a fishing reel which can diminish the transverse dimension of the reel body and the shock occurring when locking the backward rotation of the handle shaft.

In order to achieve the foregoing object, a fishing reel according to the present invention comprises a one-way mechanism including an annular member unrotatably and axially slidably mounted on the handle shaft between a drag braking mechanism and an adjusting member, an opposing member opposed to a periphery of the annular and locked against the reel body, cams defined in one of opposing faces of the annular member and the opposing member for locking the backward rotation of the handle shaft, and backward rotation locking means disposed between the cams and the other of the opposing faces, wherein the backward rotation locking means is pressingly engaged between the cams and the other of the opposing faces when the handle shaft is rotated in the backward direction thereby prohibiting the backward rotation of the handle shaft.

With this characteristic structure of the present invention, when the handle shaft is rotated in a forward direction, the backward rotation locking means of the one-way mechanism is not pressingly engaged between the cams and the other of the opposing faces whereby the handle shaft is smoothly rotated in the forward direction. On the other hand, when the handle shaft is rotated in the backward direction, the backward rotation locking means is pressingly engaged between the cams and the other of the opposing faces thereby preventing the backward rotation of the handle shaft. Then, a braking force of the drag braking mechanism mounted on the handle shaft is provided to a main gear, and a predetermined drag braking force set by the adjusting member is provided to the spool. In this backward rotation, since the backward rotation locking means engaged between the cams and the other of the opposing faces is only slightly moved, the shock caused by locking the backward rotation of the handle shaft is extensively less than in the case of utilizing the ratchet pawl meshed with the ratchet teeth defining large spaces therebetween. Thus, any shock is not provided to the fisherman but a comfortable feeling.

The annular member forming the one-way mechanism is axially slidable relative to the handle shaft and is disposed between the drag braking mechanism and the adjusting member which used to interpose the spacer. Since the braking force of the drag braking mechanism is adjusted by the adjusting mechanism through the annular member, an inner space of the reel body is advantageously utilized thereby to reduce the size of the entire reel body.

In working the present invention, the opposing member may comprises an annular member mounted on an outer periphery of the previously appearing annular member. In such case, the backward rotation locking means can effectively confront with an operating stress affecting the opposing member when engaged between the cams and the other of the opposing member, which results in a more advantageous structure in its strength than in the conventional structure employing the ratchet pawl.

The outer annular member may be relatively rotatable to the reel body and the inner annular member, and locking means may be provided for locking and unlocking rotation of the outer annular member relative to the reel body. This allows a simple structure as well as easy selection between a locking condition and an unlocking condition of the backward rotation of the handle shaft.

In addition, the backward rotation locking means may comprise rolling members rollable with the forward rotation of the annular member thereby to smoothly rotate the handle shaft.

Other objects and advantages will be apparent from a description of preferred embodiments set forth hereinafter.

DESCRIPTION OF THE PREFERRED EMBODIMENTS

Embodiments according to the present invention will be described below referring to the accompanying drawings.

Figure 1:
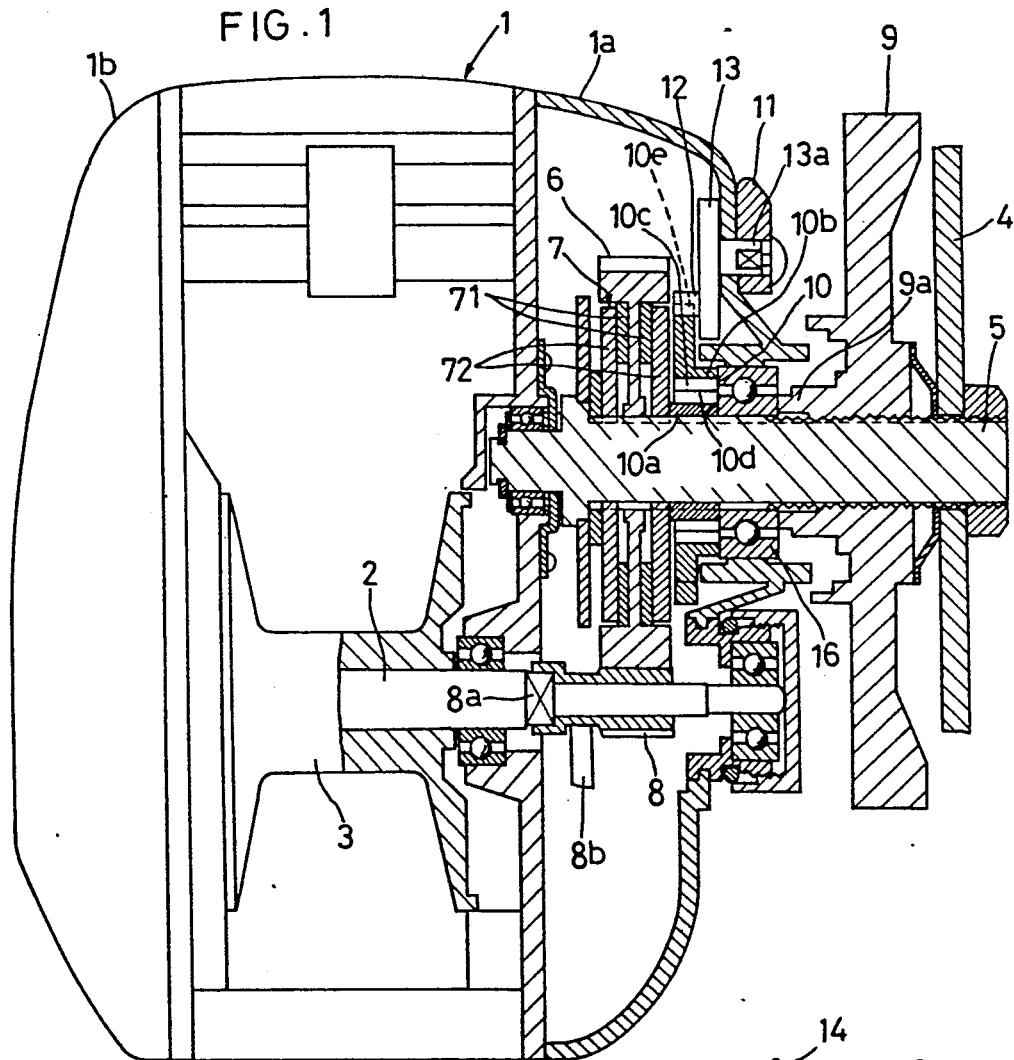
FIG. 1 is a partially broken-away front view showing a fishing reel according to the present invention.

FIG. 1 shows a two-bearing fishing reel comprising a reel body 1 including a pair of side frames 1a and 1b, a spool 3 rotatably supported between the side frames through a spool shaft 2, a handle shaft 5 rotatably supported by one of the side frames 1a and carrying a handle 4, a main gear 6 relatively rotatably supported by the handle shaft 5, and a drag braking mechanism 7 including a pair of drag brakes 71 opposed to each other across the main gear 6 and a pair of drag discs 72 opposed to each other across the drag brakes 71. The spool shaft 2 axially slidably supports a pinion gear 8 meshing with the main gear 6. With this structure, rotational drive from the handle 4 is transmitted to the handle shaft 5, the drag braking mechanism 7, the main gear 6, the pinion gear 8 and the spool shaft 2 thereby to rotate the spool 3.

The drag brakes 71 forming the drag braking mechanism 7 are relatively rotatably supported by the handle shaft 5, and the drag discs 72 are relatively unrotatable but axially movably supported by the handle shaft 5. An adjusting member 9 for the drag braking mechanism 7 is rotatably screwed on the handle shaft 5. The adjusting member 9 is rotatably operable to adjust a pressing force of the drag discs 72 to the drag brakes 71 in the drag braking mechanism 7 to vary a friction resistance between the handle shaft 5 and the main gear 6 thereby providing the spool 3 with a predetermined braking force.

The spool shaft 2 and the pinion gear 8 interpose a clutch 8a operable by a clutch lever 8b extending from the side frame 1a thereby establishing and breaking drive transmission from the handle shaft 5 to the spool shaft 2.

Figure 2:
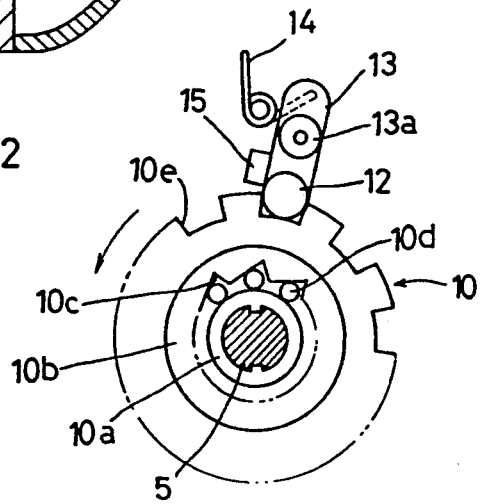
FIG. 2 is a side sectional view showing a main portion thereof.

A one-way mechanism 10 is mounted between the drag braking mechanism 7 and the adjusting member 9 around the boundary between the handle shaft 5 and the side frame 1a for permitting only one-way rotation of the handle shaft 5 and preventing backward rotation thereof. As apparent from FIG. 2, the one-way mechanism 10 includes an inner annular member 10a unrotatably and axially movably fitted on the handle shaft 5 and an outer annular member 10b relatively rotatably mounted around the inner annular member 10a to be opposed thereto. The outer annular member 10b defines in an inner periphery thereof a plurality of cams 10c having substantially V-shape sections, and including a plurality of rolling members 10d rollably disposed between the cams and the inner annular member 10a. When the handle shaft 5 is backwardly rotated in a direction of an arrow, the rolling members 10d are pressingly engaged between the cams 10c and the inner annular member 10a, respectively, thereby to prevent the backward rotation of the handle shaft 5. On the other hand, when the handle shaft 5 is forwardly rotated in a opposite direction of the arrow, the rolling members 10d are disengaged from the inner annular member 10a, respectively, thereby to permit drive rotation of the handle shaft 5. The more gentle a shape of an operational portion of each cam 10c for locking the backward rotation is, the less shock occurs at the time of backward rotation.

The outer annular member 10b is lockable and unlockable with respect to the side frame 1a through locking means. More particularly, a control member 11 for the one-way mechanism 10 is pivotably supported in the external of the side frame 1a adjacent the one-way mechanism 10, and a movable arm 13 carrying a control pawl 12 in an end portion thereof is supported inside of the side frame 1a and is interlocked with the control member 11 through an interlocking shaft 13a. The outer annular member 10b forming the one-way mechanism 10 defines a plurality of engaging grooves 10e in the outer periphery thereof for receiving the control pawl 12. The control member 11 is operable to engage the control pawl 12 defined in the arm 13 with one of the engaging grooves 10e, thereby to lock the rotation of the outer annular member 10b and to permit only one-way rotation of the handle shaft 5 in the one-way mechanism 10 in order to prevent the backward rotation thereof, while operable to release the rotation of the outer annular member 10b thereby to allow the handle shaft 5 to rotate not only in the forward direction but also in the backward direction without operating the one-way mechanism 10. A torsion spring 14 extends between the side frame 1a and an upper portion of the interlocking shaft 13a in the arm 13 for retaining a moving position of the arm 13, and a stopper 15 for the arm 13 is disposed in a lower portion of the arm 13. The torsion spring 14 and the stopper 15 in combination retain the control pawl 12 in an engagement condition with one of the engaging grooves 10e and also retain the control pawl 12 in a disengagement condition from one of the engaging grooves 10e.

In the one-way mechanism 10, the handle shaft 5 is arranged to be opposed to the drag braking mechanism 7 inwardly of a bearing 16 rotatably supported by the reel body 1, and the inner annular member 10a is movably fitted on the handle shaft 5. The adjusting member 9 includes a base end boss portion integrally forming a sleeve portion 9a projecting therefrom and contacting the bearing 16. The rotation of the adjusting member 9 causes movement of the bearing 16 and the inner annular member 10a thereby to adjust the braking force of the drag braking mechanism 7. Thus, an inner space of the reel body 1 to be advantageously utilized by the one-way mechanism 10 for adjusting the braking force of the drag braking mechanism 7, which contributes to compactness of the entire reel body 1.

According to the above-described structure, when winding up the fish caught by the hook with a backward rotational force being provided to the spool 3, the control member 11 is operated to previously retain the outer annular member 10b in a locking condition. As a result, the rolling members 10d in the one-way mechanism 10 are engaged between the cams 10c and the inner annular member 10a thereby immediately preventing the backward rotation of the handle shaft 5 without providing the fisherman with any shock, but with a comfortable feeling. According to this operation, the braking force of the drag braking mechanism 7 is provided to the main gear 6. When a drawing force of a fishing line wound on the spool 3 is smaller than the braking force of the drag braking mechanism 7, the main gear 6 is not rotated by the drag braking mechanism 7 to prevent the backward rotation of the spool 3. In contrast, when the drawing force of the fishing line is larger than the braking force of the drag braking mechanism 7, the main gear 6 is rotated relative to the handle shaft 5 while sliding the drag braking mechanism 7 thereby to backwardly rotate the spool 3.

On the other hand, the control member 11 is operated to disengage the control pawl 12 from one of the engaging grooves 10e unlocking the rotation of the outer annular member 10b in the one-way mechanism 10 regardless the braking force of the drag braking mechanism 7 to rotate the handle shaft 5 not only in the forward direction but also in the backward direction.

Other embodiments will be described hereinafter.

In the foregoing embodiment, the cams 10c are defined in the outer annular member 10b, but may be defined in the inner annular member 10a. Also, the one-way mechanism 10 may be movable not only by the inner annualar member 10a but also by its entirety.

The control member 11 is pivotably mounted on the side frame 1a in the first embodiment, which control member may be slidably supported by a slot defined in the side frame 1a in a radial direction of the outer annualar member 10b. In this case, it is preferable to define guide pieces in an inner face of the side frame 1a in opposite lateral sides of a moving locus of the control member 11.

The outer annular member 10b may be rigidly mounted on the side frame 1a, instead of providing the locking means. A portion of the side frame 1a instead of the outer annular member 10b may be opposed to the inner annular member 10a, and may define the cams 10c in an opposing face thereof to the inner annular member.

The rolling members acting as the backward rotation locking means 10d may be unrollable wedgelike members slidably contacting the inner annular member 10a and having a small friction resistance.

A resilient member may be disposed in any portions between the inner annular member 10a and the side frame 1a thereby to further absorb the shock when locking the backward rotation. More particularly, the backward rotation locking means 10d and the control pawl 12 may be formed of resilient materials, or the arms 13 and the stopper 15 may interpose a rubber member or a spring.

What is claimed is:

1. A fishing reel comprising:
a reel body;
a handle shaft rotatably mounted on said reel body and having a handle;
a main gear relatively rotatably supported by said handle shaft;
a drag braking mechanism mounted between said main gear and said handle shaft;
an adjusting member for adjusting the braking force of said drag braking mechanism, said adjusting member being mounted on said handle shaft;
one-way clutch means for preventing reverse rotation of said handle shaft, said one-way clutch means having an inner annular member relatively non-rotatably mounted on said handle shaft and an outer annular member surrounding said inner annular member, wherein said one-way clutch means prevents reverse rotation of said handle shaft when said outer annular member is locked against rotation in at least one direction relative to said reel body;
locking means for locking said outer annular member against rotation in at least one direction relative to said reel body, wherein said locking means includes:
at least one engaging portion, said engaging portion being an element of said outer annular member,
at least one engaged portion engageable with said engaging portion, and
an arm for supporting said engaged portion, said arm being supported by said reel body and being displaceable between locked and unlocked positions, wherein said engaged portion is engaged with said engaging portion when said arm is in its locked position, and wherein said engaged portion is released from said engaging portion when said arm is in its unlocked position; and
a control member for displacing said arm between its locked and unlocked positions, said control member being mounted on said reel body facing said handle.

2. A fishing reel as claimed in claim 1, wherein said engaged portion comprises a pawl member, and wherein said engaging portion comprises a groove located at an outer periphery of said outer annular member.

3. A fishing reel as claimed in claim 1, wherein a stopper is provided for preventing said arm from being swung beyond its locked position, said stopper being operatively connected to said reel body.

4. A fishing reel as claimed in claim 1, wherein said locking means further includes an urging means for maintaining said arm at either its locked position or its unlocked position.

5. A fishing reel as claimed in claim 1, wherein said inner annular member has a first opposing portion, said outer annular member having a second opposing portion;
wherein one of said first and second opposing portions comprises an anti-reverse cam, and wherein an anti-reverse member is interposed between said cam and the other of said first and second opposing portions;
wherein said anti-reverse member, in association with a reverse rotation of said handle shaft, is forcibly positioned between said cam and the other of said first and second opposing portions so as to prevent said handle shaft from rotating relative to said outer annular member.

6. A fishing reel as claimed in claim 1, wherein said inner annular member is interposed between said drag braking mechanism and said adjusting member, said inner annular member being slidable axially of said handle shaft.

7. A fishing reel as claimed in claim 1, wherein said handle shaft is supported to said reel body by a bearing provided separately from said one-way clutch means.

* * * * *